(12) United States Patent
Shon et al.

(10) Patent No.: US 8,335,918 B2
(45) Date of Patent: Dec. 18, 2012

(54) MAC FRAME PROVISION METHOD AND APPARATUS CAPABLE OF ESTABLISHING SECURITY IN IEEE 802.15.4 NETWORK

(75) Inventors: Tae-Shik Shon, Suwon-si (KR); Sun-Gi Kim, Seoul (KR); Hyo-Hyun Choi, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1118 days.

(21) Appl. No.: 12/238,578

(22) Filed: Sep. 26, 2008

(65) Prior Publication Data

US 2009/0089577 A1     Apr. 2, 2009

(30) Foreign Application Priority Data

Sep. 28, 2007 (KR) .................. 10-2007-0098000

(51) Int. Cl.
*H04L 9/00* (2006.01)
(52) U.S. Cl. .......... 713/160; 713/150; 713/161; 726/13; 370/392; 370/393; 370/394; 370/395.1
(58) Field of Classification Search .................. 713/150, 713/160, 161; 726/13; 370/392, 393, 394, 370/395.1
See application file for complete search history.

(56) References Cited

U.S. PATENT DOCUMENTS

| | | | | |
|---|---|---|---|---|
| 7,773,569 | B2 * | 8/2010 | Belcea | 370/338 |
| 8,005,460 | B2 * | 8/2011 | Chen et al. | 455/411 |
| 2006/0176896 | A1 * | 8/2006 | Callaway et al. | 370/437 |
| 2007/0206560 | A1 * | 9/2007 | Stratigakis | 370/345 |
| 2007/0206628 | A1 * | 9/2007 | Nishio et al. | 370/445 |
| 2007/0225044 | A1 * | 9/2007 | Law et al. | 455/562.1 |
| 2008/0075005 | A1 * | 3/2008 | Kim et al. | 370/230 |

OTHER PUBLICATIONS

Sokullus et al., On the IEEE 802.15.4 MAC Layer Attacks GTS Attack, Aug. 2008, Sensor Technologies and Applications, 2008, pp. 673-678.*
Misic et al., "MAC layer security of 802.15.4-compliant networks", 2005, Mobile Adhoc and Sensor Systems Conference, 2005, pp. 8pp.*
Xiao et al., "Security Services and Enhancements in the IEEE 802.15.4 Wireless Sensor Networks", 2005, IEEE Globecom 2005 Proceedings, pp. 1796-1800.*

(Continued)

*Primary Examiner* — Kambiz Zand
*Assistant Examiner* — Tongoc Tran
(74) *Attorney, Agent, or Firm* — Cha & Reiter, LLC

(57) ABSTRACT

A medium access control (MAC) frame provision method establishes security in an IEEE 802.15.4 network. A MAC frame is generated, which includes a MAC header, a payload field, and a frame check sequence (FCS) field, the payload field including relevant main data according to a frame type defined in the MAC header. A disguised decoy data sequence number (DSN) is generated and inserted into the MAC header. A real DSN, which is a corresponding transmission sequence number of the MAC frame, is generated and inserted into the payload field. The MAC frame is transmitted, including the encrypted payload field, to a counterpart node. A MAC ACK frame acknowledges reception of the transmitted MAC frame; and a DSN is compared in the received MAC ACK frame with the real DSN. An authentication of the counterpart node is performed when the received MAC ACK frame is equal to the real DSN.

17 Claims, 9 Drawing Sheets

OTHER PUBLICATIONS

Ozturk et al., "Source-location privacy in energy-constrained sensor network routing", SASN '04 Proceedings of the 2nd ACM workshop on Security of ad hoc and sensor networks.*

Sokullu et al., "An Investigation on IEEE 802.15.4 MAC Layer Attacks", Proceedings of the 10th International Symposium on Wireless Personal Multimedia Communications (WPMC) 2007, Mar. 12, 2007-Jun. 12, 2007.*

Citation for "An Investigation on IEEE 802.15.4 MAC Layer Attacks".*

Citation for "Source-location privacy in energy-constrained sensor network routing".*

* cited by examiner

| Octets :2 | 1 | 0/2 | 0/2/8 | 0/2 | 0/2/8 | Variable | 2 |
|---|---|---|---|---|---|---|---|
| Frame control (106) | Sequence -number (108) | Destination PAN identifier (110) | Destination address (112) | Source PAN identifier (114) | Source address (116) | Frame payload (102) | FCS (104) |
| | | \multicolumn{4}{c}{Addressing fields (118)} | | | |
| \multicolumn{6}{c}{MHR (100)} | MAC payload (120) | MFR (122) |

FIG. 1
(PRIOR ART)

| Octets :2 | 1 | 2 |
|---|---|---|
| Frame control (202) | Sequence number (204) | FCS (206) |
| \multicolumn{2}{c}{MHR (200)} | MFR (208) |

FIG. 2
(PRIOR ART)

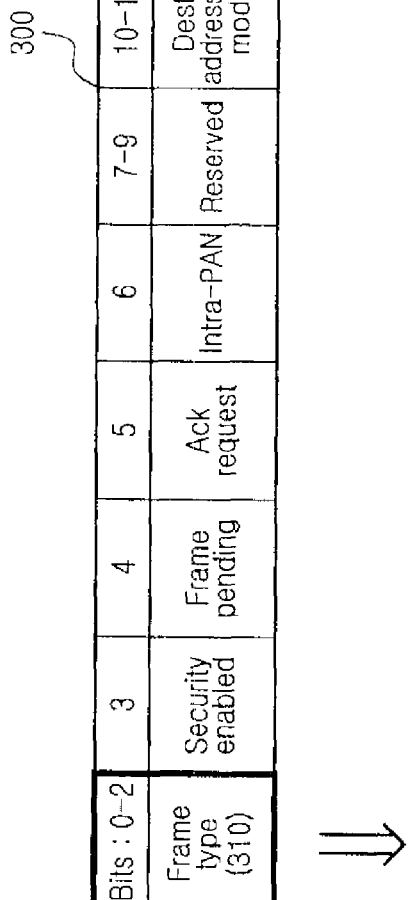
FIG.3A (PRIOR ART)
FIG.3B (PRIOR ART)

MAC FRAME PROVISION METHOD AND APPARATUS CAPABLE OF ESTABLISHING SECURITY IN IEEE 802.15.4 NETWORK

CLAIM OF PRIORITY

This application claims priority from an application entitled "MAC Frame Provision Method And Apparatus Capable Of Establishing Security In IEEE 802.15.4 Network" filed with the Korean Intellectual Property Office on Sep. 28, 2007 and assigned Serial No. 2007-98000, the contents of which are incorporated herein by reference in its entirety.

BACKGROUND OF THE INVENTION

1. Field of the Invention

The present invention relates to security in a network environment based on the IEEE 802.15.4 PHY/MAC standard. More particularly, the present invention relates to a MAC frame provision method and apparatus capable of preventing a forged ACK attack.

2. Description of the Related Art

Currently, the IEEE 802.15.4 standard, which is a physical-layer standard of ZigBee™, supports near-field communication, and has characteristics of relatively low cost, relatively low power consumption, and a high degree of security based on packets and a large-scale network. In addition, a goal of IEEE 802.15.4 is to implement a low-speed personal area network (PAN), such as Wi-Fi, which can coexist with other wireless networks. Therefore, the IEEE 802.15.4 standard is very suitable for devices for monitoring and controlling in wireless data communication that require stability and relatively low power consumption.

Generally, when a medium access control (MAC) frame is transmitted in the IEEE 802.15.4 network, nodes constituting a PAN or virtual cluster access a medium with a frame structure corresponding to a certain unit, as shown below.

| MAC Header | Payload | FCS |
|---|---|---|
| 32 bytes | 0~1514 bytes | 4 bytes |

FIG. 1 is a view illustrating the structure of a MAC frame in a conventional IEEE 802.15.4 network. First, the MAC frame includes a MAC header (MHR) 100, a frame payload 102 for carrying appropriate main data according to a frame type defined in the MAC header 100, and a frame check sequence (FCS) field 104. The MHR 100 includes: a frame control field 106 for providing the characteristics of a physical layer and frame information; a sequence number (SEQ) field 108 which has a length of one byte, which is dedicated for unicast data communication in order to prevent the same message from being received twice, and has a value increasing by one when individual communication data exists in a payload, the value being within a range from 0 to 255; and addressing fields 118 including a destination PAN identifier field 110, a destination address field 112, a source PAN identifier field 114, and a source address field 116.

FIG. 2 is a view illustrating the structure of a MAC ACK frame for acknowledging reception of a transmitted MAC frame in the conventional IEEE 802.15.4 network. The MAC ACK frame is a response frame to the MAC frame, and includes a MAC header 200 and a frame check sequence (FCS) field 206. The MAC header 200 includes a frame control field 202 for providing the characteristics of a physical layer and frame information, and a sequence number (SEQ) field 204 which has a length of one byte, is dedicated for unicast data communication in order to prevent the same message from being received twice, and has a value increasing by one when individual communication data exists in a payload, in which the value is within a range from 0 to 255.

FIG. 3A is a view illustrating the structure of the frame control field, and FIG. 3B is a view illustrating the format of a frame type that is shown in FIG. 3A. As shown in FIG. 3B, various MAC frames may be classified into beacon, data, acknowledgment, and MAC command by the control fields of MAC frame headers.

In defining the format and fields of a frame to be used to communicate and transmitting the frame in the IEEE 802.15.4 network, as described above, an additional security function is not supported by the current IEEE 802.15.4 standard, thereby making it vulnerable to security breaches. Especially, since not only a security function for a data sequence number (DSN), but also security functions for both a MAC header including the DSN and an ACK frame, which is a response frame to the MAC header, are absent, the frames and headers are openly exposed to an attack in the network environments, so that they may be used for an illegal purposes.

The vulnerability in security discussed in the aforementioned paragraph may cause a forged ACK attack. In more detail, such vulnerability in security leaves open vulnerability to: a traffic-flooding attack of transmitting excessive traffics; a bogus routing information attack of obstructing communication in such a manner as to intentionally generate errors by spoofing/changing a routing message or by disturbing a routing, to create a routing loop, or to delay transmission of routing information, as shown in FIG. 4A; a selective forwarding/sinkhole attack of rejecting or deleting a specific message or transmission to a node, as shown in FIG. 4B; and a wormholes attack causing a non-existing node connection to be recognized as an existing node connection, as shown in FIG. 4C, which causes serious problems in network security.

SUMMARY OF THE INVENTION

Accordingly, the present invention provides a method and apparatus for determining if a data sequence number (DSN) in a MAC frame header is forged through efficient and simple mutual authentication between both ends, without a change in a MAC frame, upon transmitting the MAC frame in an IEEE 802.15.4 network, thereby preventing a forged ACK attack.

In accordance with an exemplary aspect of the present invention, there is provided a medium access control (MAC) frame provision method capable of establishing security in an IEEE 802.15.4 network, the method including the steps of generating a MAC frame which includes a MAC header, a payload field, and a frame check sequence (FCS) field, the MAC header providing general information about communication, the payload field including relevant main data according to a frame type defined in the MAC header; generating and inserting a disguised decoy data sequence number (DSN) into the MAC header; generating and inserting a real DSN, which is a corresponding transmission sequence number of the MAC frame, into the payload field; encrypting the payload field with a predetermined link key, which is shared by a plurality of nodes in the corresponding network, and transmitting the MAC frame including the encrypted payload field to a counterpart node; receiving a MAC ACK frame for acknowledging reception of the transmitted MAC frame; comparing a DSN in the received MAC ACK frame with the real DSN; and performing authentication of the counterpart node when it is determined that the DSN in the received MAC ACK frame is equal to the real DSN as a result of the comparison.

In accordance with another exemplary aspect of the present invention, there is provided a medium access control (MAC) frame provision apparatus capable of establishing security in an IEEE 802.15.4 network, the apparatus including a receiving unit for receiving a MAC frame and a MAC ACK frame, which is a response frame to the MAC frame, through the IEEE 802.15.4 network; a MAC frame generating unit for generating a MAC frame and a MAC ACK frame when an instruction to generate the MAC frame and the MAC ACK frame is received from a controlling unit, the MAC frame including a MAC header, a payload field, and a frame check sequence (FCS) field, wherein the MAC header includes a frame control field for providing characteristics of a physical layer and information about a frame type, a randomly generated decoy data sequence number (DSN), and an address field, and the payload field includes an encrypted payload field containing appropriate main data according to a frame type defined in the MAC header, and a real DSN of the corresponding frame, which is included in order to prevent an equal message from being received twice, the MAC ACK frame including a header and an FCS field, wherein the header includes a frame control field and a 1-byte real DSN of the corresponding frame included in the encrypted payload field of the received MAC frame; and the controlling unit for distinguishing between a MAC frame and a MAC ACK frame, which are input from the receiving unit, and when the MAC frame is received, decrypting an encrypted payload field in a MAC header, performing authentication, extracting a real DSN from the payload field, and instructing the MAC frame generating unit to generate a MAC ACK frame, which is a response frame to the received MAC frame, by using the extracted real DSN.

BRIEF DESCRIPTION OF THE DRAWINGS

The above and other aspects, features and advantages of the present invention will be more apparent from the following detailed description taken in conjunction with the accompanying drawings, in which:

FIG. 1 is a view illustrating the structure of a MAC frame in a conventional IEEE 802.15.4 network;

FIG. 2 is a view illustrating the structure of a MAC ACK frame for acknowledging reception of a transmitted MAC frame in the conventional IEEE 802.15.4 network;

FIG. 3A is a view illustrating the structure of the frame control field, and FIG. 3B is a view illustrating the format of a frame type of the frame control field shown in FIG. 3A;

DETAILED DESCRIPTION

Hereinafter, an example of the present invention will be described with reference to the accompanying drawings. In the below description, many particular items such as a detailed component device are shown, but these are given only for illustrative purposes and the present invention is not limited to the examples shown and described herein. It will be understood by those skilled in the art that various changes in form and detail may be made within the scope of the present invention.

First, it should be noted that while the present invention refers to securing data communication in a sensor network based on the IEEE 802.15.4 standard, and particularly to security requirements required upon transmission of a MAC frame and a structure for security of the MAC frame in a sensor network, the invention is applicable in other networks as well.

The present invention is implemented, for example, in a data link layer where a link level connection starts, data received from an upper layer is divided into frames and is then transmitted to a physical layer, an acknowledgment for confirming transmission between nodes is exchanged to recover errors, and verification for data in a frame is performed through checking of control bits in the frame.

In addition, the present invention is based on the assumption that a base station can be constructed in a sensor network, and all nodes to communicate within the same base station share a link key encrypted for data security.

Hereinafter, for convenience of description, a node transmitting a MAC frame will be referred to as a first node, and a node generating a MAC ACK frame for acknowledging reception of the MAC frame will be referred to as a second node.

Figure 4A:
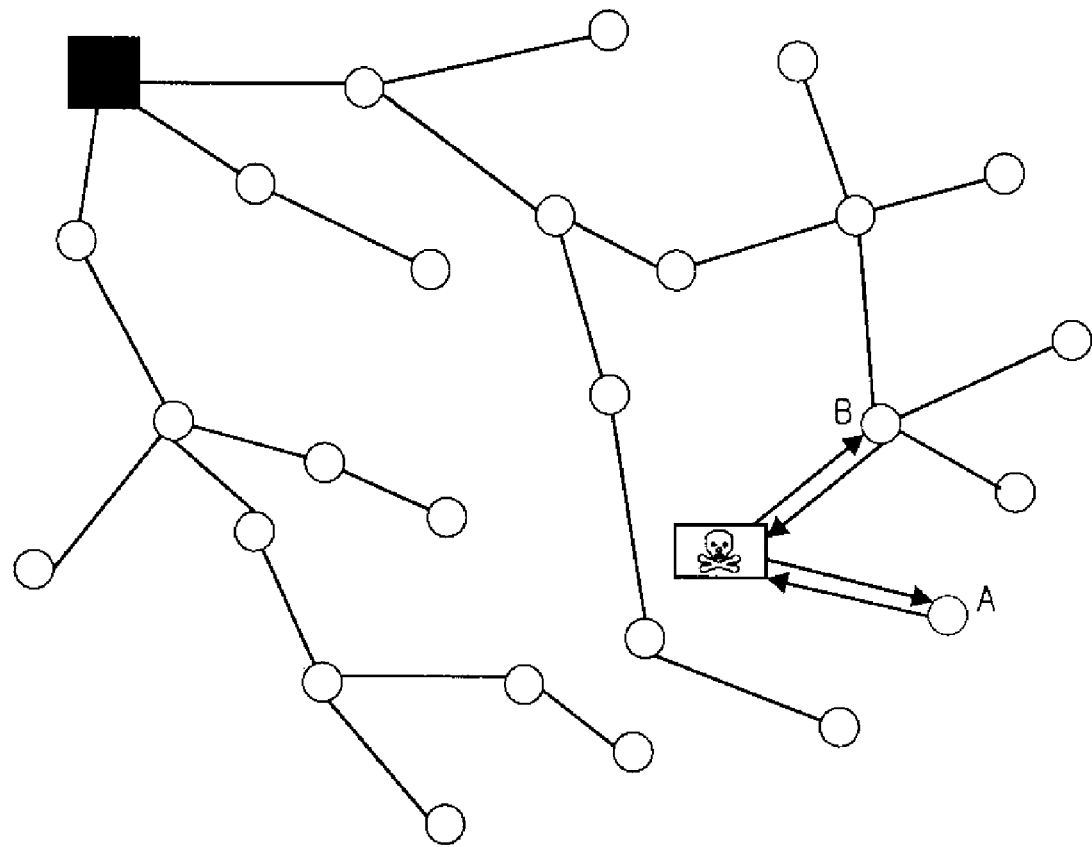
FIGS. 4A to 4C are views illustrating various attacks in networks.
Figure 4B:
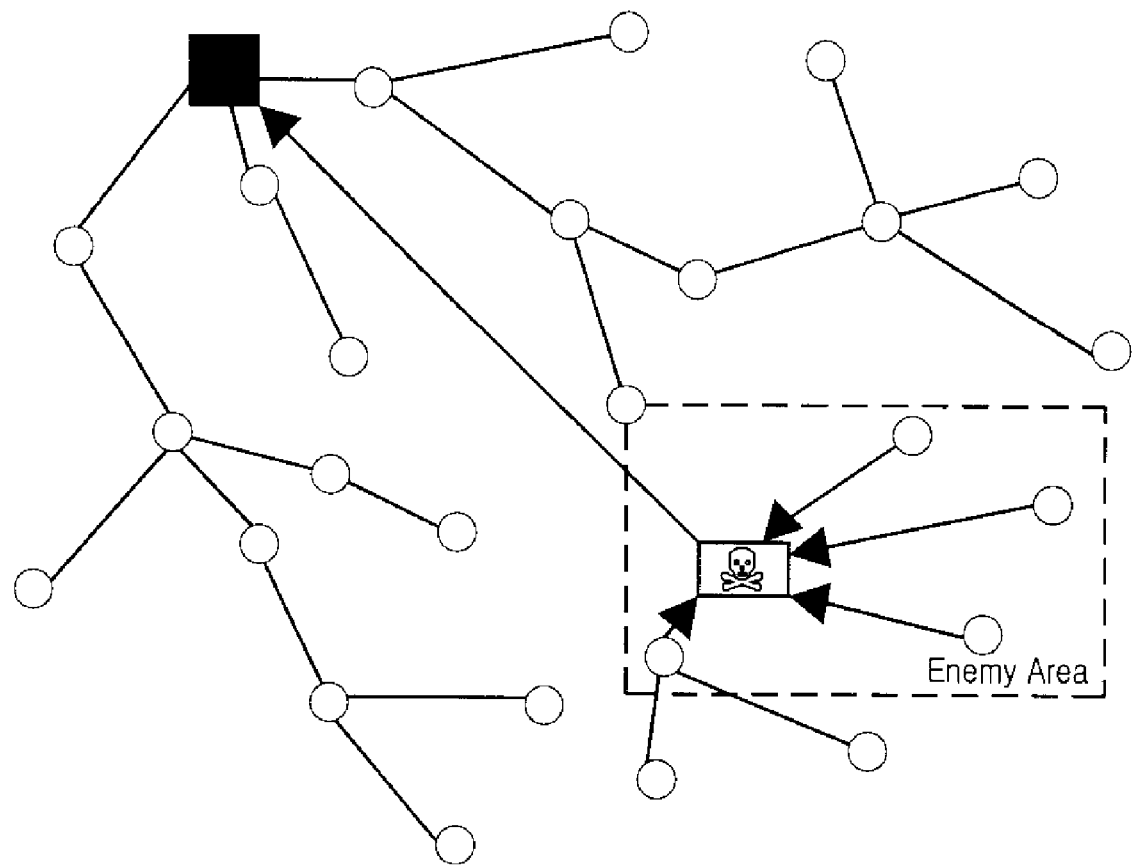
Figure 4C:
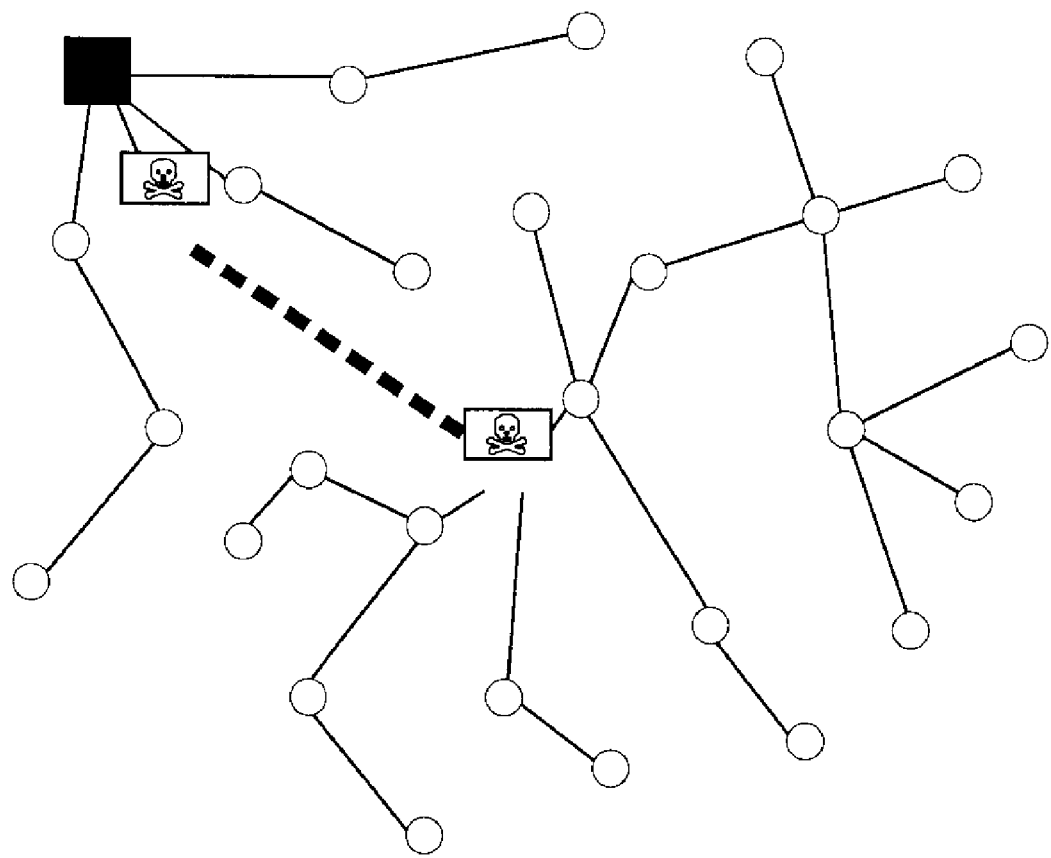
Figure 5:
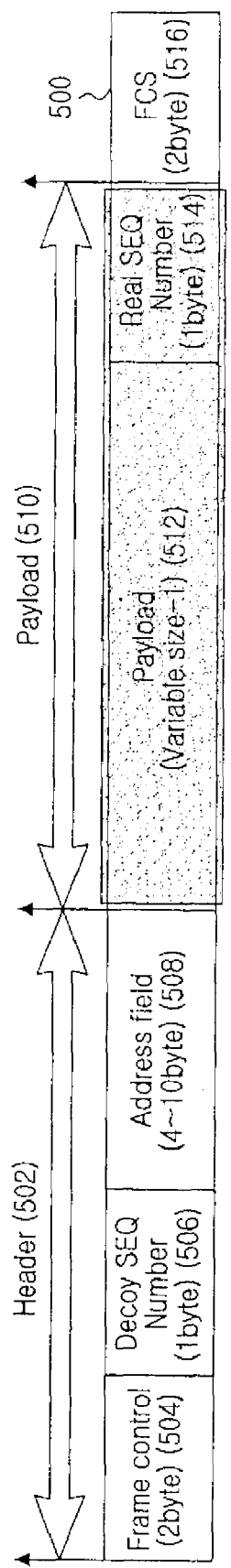
FIG. 5 is a view illustrating the structure of a MAC frame in an IEEE 802.15.4 network according to an exemplary embodiment of the present invention.

FIG. 5 is a view illustrating the structure of a MAC frame in an IEEE 802.15.4 network according to an exemplary embodiment of the present invention. The MAC frame 500 includes a MAC header 502, a payload field 510, and a frame check sequence (FCS) field 516. The MAC header 502 includes a frame control field 504 having a size of 2 bytes and providing the characteristics of a physical layer and frame information, a decoy data sequence number (DSN) field 506 having a size of 1 byte and including a randomly created decoy DSN, and an address field 508 including a receiving-device personal area network (PAN) identifier field, a receiving-device address field, a transmission PAN identifier field, and a transmission address field. The payload field 510 includes a payload field 512 which includes appropriate main data according to a frame type defined in the MAC header 502 and is encrypted, and a real DSN field 514, which corresponds to the last one byte region of the payload field 512 and includes the real DSN of a corresponding frame, in order to prevent the same message from being received twice.

Still referring to FIG. 5, the decoy DSN of the decoy DSN field 506 does not correspond to a real sequence number of the corresponding frame, but rather corresponds to a sequence number disguised to authenticate a counterpart node upon receiving an ACK packet. As described above, a real sequence number is a value included in the real DSN field 514 corresponding to the last one byte of the payload field 512.

Figure 6:
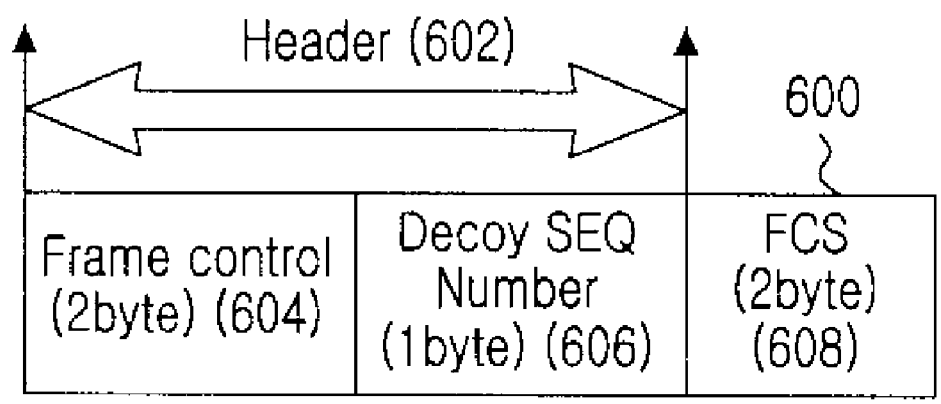
FIG. 6 is a view illustrating the structure of a MAC ACK frame in the IEEE 802.15.4 network according to an exemplary embodiment of the present invention.

FIG. 6 is a view illustrating the structure a MAC ACK frame in the IEEE 802.15.4 network according to an exemplary embodiment of the present invention. According to an exemplary embodiment of the present invention, the MAC ACK frame 600 is used as a response frame for acknowledging reception of the transmitted MAC frame 500, and includes a header 602 and an FCS field 608. The header 602 includes a frame control field 604 having a size of 2 bytes and providing the characteristics of a physical layer and frame information, and a real DSN field 606 having a size of 1 byte and including the real DSN of the corresponding frame, which is included in the encrypted payload field 512 of the received MAC frame 500.

Hereinafter, a MAC frame provision method for establishing security in the IEEE 802.15.4 network according to an exemplary embodiment of the present invention will be described with reference to the aforementioned MAC frame structure according to the present invention and FIG. 7.

Figure 7:
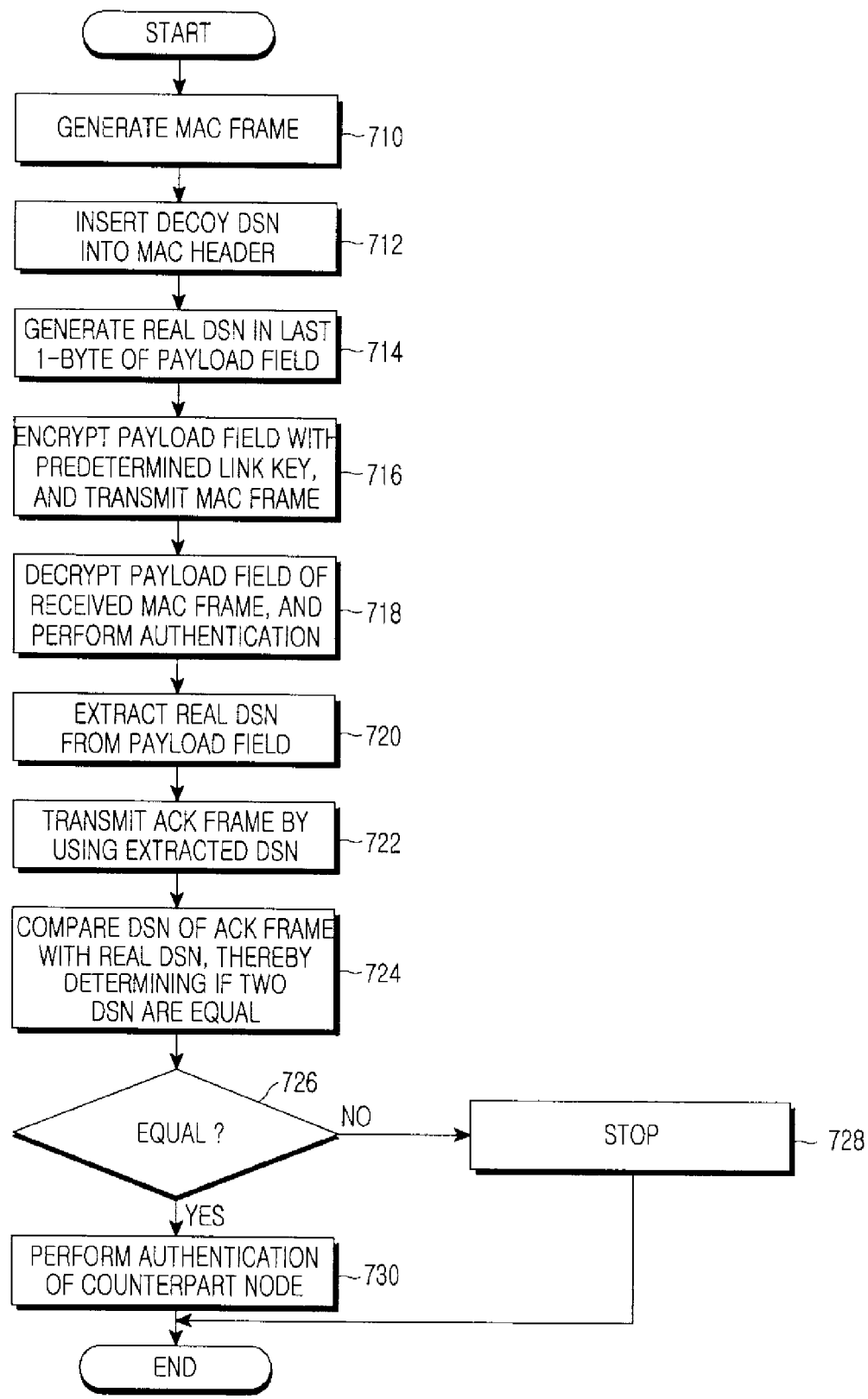
FIG. 7 is a flowchart illustrating a MAC frame provision method for establishing security in the IEEE 802.15.4 network according to an exemplary embodiment of the present invention.

FIG. 7 is a flowchart illustrating exemplary steps of a MAC frame provision method for establishing security in the IEEE 802.15.4 network according to an exemplary embodiment of the present invention. First, a MAC frame for data transmission/reception is generated in a data link layer in step 710. Here, the generated MAC frame (one such example is shown in FIG. 5) includes a MAC header 502, an encrypted payload field 510, and an FCS field 500. The MAC header includes a frame control field 504 having a size of 2 bytes and providing the characteristics of a physical layer and frame information, and an address field 508 including a receiving-device PAN identifier field, a receiving-device address field, a transmission PAN identifier field, and a transmission address field. The encrypted payload field includes appropriate main data according to a frame type defined in the MAC header. Upon generating the MAC header, a decoy DSN 506 having a size of 1 byte is randomly generated and inserted into the MAC header in step 712. The decoy DSN 506 is not a real sequence number of the corresponding frame, but rather is a sequence number disguised to authenticate a counterpart node upon receiving an ACK packet.

In addition, a real DSN 514 corresponding to a real sequence number of the corresponding frame is generated and inserted into the last 1-byte region of the encrypted payload field 510 in order to preventing the same message from being received twice in step 714. The payload field 510 including the real DSN 514 is encrypted with a predetermined link key, and then the entire MAC frame is transmitted to a counterpart node, i.e. to the second node in step 716. Here, the link key is shared by all nodes to communicate within the coverage of the same base station in the IEEE 802.15.4 network according to the present invention, and is an encrypted link key predetermined for data security.

The MAC frame is transferred to a physical layer of the first node, and then is transmitted to a physical layer of the counterpart node (i.e. the second node) through the IEEE 802.15.4 network.

The second node, having received the MAC frame, decrypts the encrypted payload field in the MAC frame, thereby performing verification, i.e. authentication, of the first node that has transmitted the MAC frame in step 718.

Then, the second node extracts a real DSN, which corresponds to a real sequence number of the corresponding frame, from the decrypted payload field of the MAC frame in step 720. The second node generates a MAC ACK frame (one such example shown in FIG. 6) for acknowledging reception of the transmitted MAC frame by using the extracted DSN, and transmits the generated ACK frame to the first node in step 722. In this case, the MAC ACK frame includes a header 602 and an FCS field 600. The header includes a frame control field 604 having a size of 2 bytes and providing the characteristics of a physical layer and frame information, and a real DSN field 606 having a size of 1 byte and including the real DSN of the corresponding frame, which is included in the encrypted payload field of the received MAC frame.

When receiving the MAC ACK frame in response to the transmitted MAC frame, the first node compares the DSN included in the payload field within the MAC ACK frame with the real DSN inserted into the payload field upon generating the MAC frame in step 724. Then, the first node determines whether the two DSNs are equal to each other in step 726. Upon determination that the two DSNs are equal to each other, the first node performs authentication of the MAC ACK frame transmitted from the second node in step 730. In contrast, when it is determined that the two DSNs are different from each other, the first node stops the authentication of the second node in step 728.

Figure 8:
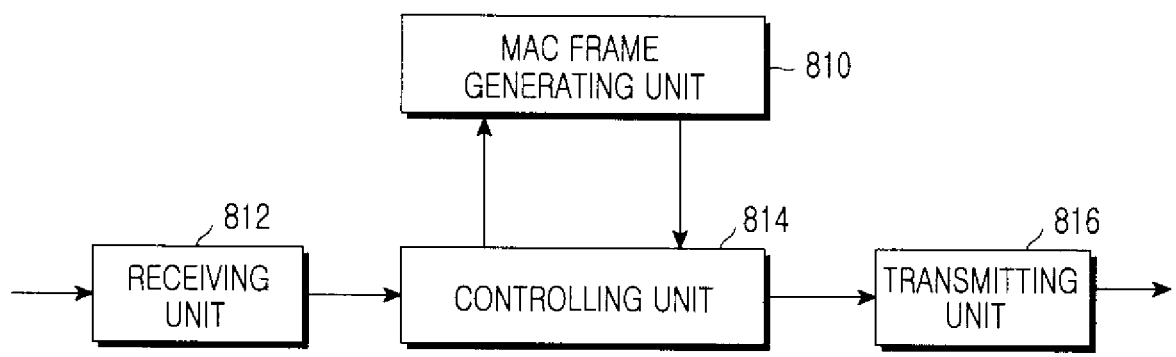
FIG. 8 is a detailed block diagram illustrating a MAC frame provision apparatus for a MAC frame provision node capable of establishing security in the IEEE 802.15.4 network according to an exemplary embodiment of the present invention.

FIG. 8 is a detailed block diagram illustrating exemplary structure of a MAC frame provision apparatus for a MAC frame provision node capable of establishing security in the IEEE 802.15.4 network according to an exemplary embodiment of the present invention. A node in the IEEE 802.15.4 network includes a MAC frame generating unit 810, a receiving unit 812, a controlling unit 814, and a transmitting unit 816.

The receiving unit 812 receives a MAC frame or a MAC ACK frame, which is a response frame to the MAC frame, through the IEEE 802.15.4 network.

The controlling unit 814 distinguishes between the MAC frame and the MAC ACK frame, which is a response frame to the MAC frame, the frames being received from the receiving unit 812. When receiving the MAC frame from the receiving unit 812, the controlling unit 814 performs decryption and authentication operations of an encrypted payload field within the MAC header of the MAC frame (one possible example shown in FIG. 5). Then, the controlling unit 814 extracts a real DSN from the payload field, and instructs the MAC frame generating unit 810 to generate an ACK frame, which is a response frame to the received MAC frame, by using the real DSN.

When instructed to generate a MAC ACK frame from the controlling unit 814, the MAC frame generating unit 810 generates a MAC ACK frame, which includes a header and an FCS field. Here, the header includes a frame control field having a size of 2 bytes and providing the characteristics of a physical layer and frame information, and a real DSN field having a size of 1 byte and including the real DSN of the corresponding frame, which is included in the encrypted payload field of the received MAC frame.

The generated MAC ACK frame is then transmitted to a counterpart node via the controlling unit 814 and the transmitting unit 816.

Meanwhile, when receiving a MAC ACK frame from the receiving unit 812, the controlling unit 814 compares a real DSN included in a header field within the MAC ACK frame with a real DSN inserted into a payload field within a previously generated MAC frame, determines if the two DSNs are equal to each other, performs authentication of the counterpart node when the two DSNs are equal to each other, and then instructs the MAC frame generating unit 810 to generate the next MAC frame. In this case, the MAC frame generating unit 810 first generates a corresponding MAC frame including a MAC header, a payload field, and an FCS field. In this case, the MAC header includes a frame control field having a size of 2 bytes and providing the characteristics of a physical layer and frame information, a decoy DSN field 506 having a size of 1 byte and including a randomly created decoy DSN, and an address field including a receiving-device PAN identifier field, a receiving-device address field, a transmission PAN identifier field, and a transmission address field. In addition, the payload field includes an encrypted payload field including appropriate main data according to a frame type defined in the MAC header, and a real DSN field, which corresponds to the last one byte region of the payload field and includes the real DSN of a corresponding frame in order to prevent the same message from being received twice.

The generated MAC frame is transmitted to the counterpart node via the controlling unit 814 and the transmitting unit 816.

According to the present invention as described above, it is possible to prevent the sequence number of a MAC frame from being stolen and forged, by using a real DSN within the payload of the MAC frame and a decoy DSN within the header, without a change in the MAC frame in the IEEE 802.15.4 network, and it is possible to prevent a forged ACK attack.

The MAC frame provision method and apparatus for establishing security in the IEEE 802.15.4 network according to an exemplary embodiment of the present invention can be achieved as described above. Meanwhile, while the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof For one such example, the arrangement of the decoy and real DSN could be arranged differently than shown. In addition, while the exemplary network shown and described is an IEEE 802.15.4 network, a person of ordinary art understand and appreciates that the present invention is in no way limited to such a type of network.

What is claimed is:

1. A medium access control (MAC) frame provision method for establishing security in a network, the method comprising the steps of:
    generating a MAC frame comprising a MAC header, a payload field, and a frame check sequence (FCS) field, the MAC header providing general information about communication, the payload field including relevant main data according to a frame type defined in the MAC header;
    generating and inserting a disguised decoy data sequence number (DSN) into the MAC header;
    generating and inserting a real DSN comprising a corresponding transmission sequence number of the MAC frame, into the payload field;
    encrypting the payload field with a predetermined link key shared by a plurality of nodes in the network, and transmitting the MAC frame including the encrypted payload field by a first counterpart node to a second counterpart node;
    receiving a MAC ACK frame from the second counterpart node acknowledging reception of the transmitted MAC frame;
    comparing a DSN in the received MAC ACK frame with the real DSN; and
    performing authentication of the second counterpart node upon determining that the DSN in the received MAC ACK frame is equal to the real DSN as a result of the comparison.

2. The method according to claim 1, wherein the network comprises an IEEE 802.15.4 network.

3. The method as claimed in claim 1, further comprising the steps of:
    decrypting by the second counterpart node the encrypted payload field in the received MAC frame, and performing authentication of the first node which has transmitted the MAC frame; and
    extracting the real DSN from the payload field, generating the MAC ACK frame by using the real DSN, and transmitting the MAC ACK frame to the first counterpart node.

4. The method as claimed in claim 1, wherein the real DSN is inserted into a last 1-byte region in the payload field.

5. The method as claimed in claim 1, wherein the MAC header comprises a frame control field having a size of 2 bytes for providing characteristics of a physical layer and frame information.

6. The method as claimed in claim 1, wherein the MAC ACK frame comprises a header and an FCS field, wherein the header contains a frame control field for providing characteristics of a physical layer and frame information, and a real DSN field including the real DSN of the corresponding frame included in the encrypted payload field of the received MAC frame.

7. The method as claimed in claim 5, wherein a plurality of frame types are distinguished by the frame control field.

8. The method according to claim 7, wherein the plurality of frame types include one or more of: a Beacon, a Data, a Acknowledgment, and a MAC Command.

9. The method as claimed in claim 1, wherein, upon determining that the DSN in the received MAC ACK frame is different from the real DSN as a result of the comparing step, performing authentication of the second counterpart node is stopped.

10. A medium access control (MAC) frame provision apparatus for establishing security in a network, said apparatus comprising:
    a receiving unit for receiving a MAC frame and a MAC ACK frame, which is a response frame to the MAC frame, through the network;
    a MAC frame generating unit for generating the MAC frame and the MAC ACK frame when an instruction to generate the MAC frame and the MAC ACK frame is received from a controlling unit,
    said MAC frame comprising a MAC header, a MAC payload field, and a MAC frame check sequence (FCS) field, wherein the MAC header includes a frame control field for providing characteristics of a physical layer and information about a frame type, a randomly generated decoy data sequence number (DSN), and an address field, and the MAC payload field includes an encrypted payload field containing predetermined main data according to a frame type defined in the MAC header, and a real DSN of the corresponding frame included for preventing an equal message from being received twice,
    said MAC ACK frame comprising a MAC ACK header and a MAC ACK FCS field, wherein the MAC ACK header includes a frame control field and a 1-byte real DSN of the corresponding received MAC frame included in the encrypted payload field of the received MAC frame; and
    said controlling unit for distinguishing between the MAC frame and the MAC ACK frame input from the receiving unit, and when the MAC frame is received for decrypting an encrypted payload field in the MAC header, for performing authentication, for extracting a real DSN from the payload field, and for instructing the MAC frame generating unit for generating the MAC ACK frame in response to the received MAC frame, by using the extracted real DSN.

11. The apparatus according to claim 10, wherein the network comprises an IEEE 802.15.4 network.

12. The apparatus as claimed in claim 10, further comprising a transmitting unit for transmitting the MAC frame and the MAC ACK frame transferred from the controlling unit, to a counterpart node.

13. The apparatus as claimed in claim 10, wherein, when the MAC ACK frame is input to the controlling unit from the receiving unit, the controlling unit for comparing a real DSN of the MAC ACK header in the MAC ACK frame with a real DSN of the payload field in the previously generated MAC frame, for determining whether the two real DSNs are equal to each other, and for performing authentication of a counterpart node when the two real DSNs are equal to each other, and for instructing the MAC frame generating unit to generate a next MAC frame.

14. The apparatus as claimed in claim 10, wherein the real DSN is inserted into a last 1-byte region in the payload field of the MAC frame.

15. The apparatus as claimed in claim 10, wherein a plurality of frame types are distinguished by the frame control field of the MAC frame.

16. The apparatus according to claim 15, wherein the plurality of frame types comprises one or more of a as Beacon, Data, Acknowledgment, and MAC Command frames.

17. The apparatus according to claim 10, wherein the controlling unit compares a real DSN of the MAC ACK header in the MAC ACK frame with a real DSN of the payload field in the previously generated MAC frame, determines whether the two real DSNs are equal to each other, and stops authentication of a counterpart node upon determining the two real DSNs are unequal to each other.

\* \* \* \* \*

UNITED STATES PATENT AND TRADEMARK OFFICE
CERTIFICATE OF CORRECTION

| | |
|---|---|
| PATENT NO. | : 8,335,918 B2 |
| APPLICATION NO. | : 12/238578 |
| DATED | : December 18, 2012 |
| INVENTOR(S) | : Tae-Shik Shon et al. |

It is certified that error appears in the above-identified patent and that said Letters Patent is hereby corrected as shown below:

In the Claims:

Column 10, Claim 16, Line 8 should read as follows:
--...one or more of a Beacon...--

Signed and Sealed this
Seventh Day of May, 2013

Teresa Stanek Rea
*Acting Director of the United States Patent and Trademark Office*